United States Patent
Olszak et al.

(10) Patent No.: US 7,864,369 B2
(45) Date of Patent: *Jan. 4, 2011

(54) LARGE-AREA IMAGING BY CONCATENATION WITH ARRAY MICROSCOPE

(75) Inventors: Artur G. Olszak, Tucson, AZ (US); Chen Liang, Tucson, AZ (US)

(73) Assignee: Dmetrix, Inc., Tuson, AZ (US)

( * ) Notice: Subject to any disclaimer, the term of this patent is extended or adjusted under 35 U.S.C. 154(b) by 506 days.

This patent is subject to a terminal disclaimer.

(21) Appl. No.: 12/002,107

(22) Filed: Dec. 14, 2007

(65) Prior Publication Data

US 2008/0095467 A1  Apr. 24, 2008

Related U.S. Application Data

(63) Continuation-in-part of application No. 11/711,283, filed on Feb. 27, 2007, which is a continuation-in-part of application No. 10/637,486, filed on Aug. 11, 2003, now Pat. No. 7,184,610, which is a continuation of application No. PCT/US02/08286, filed on Mar. 19, 2002, application No. 12/002,107, which is a continuation-in-part of application No. 10/687,432, filed on Oct. 16, 2003, now abandoned.

(60) Provisional application No. 60/276,498, filed on Mar. 19, 2001.

(51) Int. Cl.
*G06T 5/50* (2006.01)
*G02B 21/18* (2006.01)

(52) U.S. Cl. .................. 358/1.9; 358/474; 382/284; 382/128; 359/374

(58) Field of Classification Search ................. 382/141, 382/128, 284; 359/368, 372, 373, 374; 358/1.9, 358/474

See application file for complete search history.

(56) References Cited

U.S. PATENT DOCUMENTS

| | | |
|---|---|---|
| 5,694,481 A | 12/1997 | Lam et al. |
| 5,768,443 A | 6/1998 | Michael et al. |
| 6,069,973 A | 5/2000 | Lin et al. |
| 6,157,747 A | 12/2000 | Szeliski et al. |
| 6,320,174 B1 | 11/2001 | Tafas et al. |
| 7,184,610 B2 * | 2/2007 | Weinstein et al. ........... 382/284 |
| 2001/0038717 A1 | 11/2001 | Brown |
| 2001/0045988 A1 | 11/2001 | Yamauchi et al. |

* cited by examiner

*Primary Examiner*—Thomas D Lee
(74) *Attorney, Agent, or Firm*—Antonio R. Durando

(57) ABSTRACT

An imaging apparatus consists of multiple miniaturized microscopes arranged into an array capable of simultaneously imaging respective portions of an object. A continuous linear translation approach is followed to scan the object and generate multiple image swaths of the object. In order to improve the quality of the composite image produced by concatenation of the image swaths, the performance of each microscope is normalized to the same base reference for each relevant optical-system property. Correction factors are developed through calibration to equalize the spectral response measured at each detector, to similarly balance the gains and offsets of the detector/light-source combinations associated with the various objectives, to correct for geometric misalignments between microscopes, and to correct optical and chromatic aberrations in each objective.

17 Claims, 12 Drawing Sheets

LARGE-AREA IMAGING BY CONCATENATION WITH ARRAY MICROSCOPE

RELATED APPLICATIONS

This application is a continuation-in-part of U.S. Ser. No. 11/711,283, filed Feb. 27, 2007, which is a continuation-in-part of U.S. Ser. No. 10/637,486, filed Aug. 11, 2003, now U.S. Pat. No. 7,184,610, which is based on PCT/US02/08286, filed Mar. 19, 2002, and claims the benefit of priority of U.S. Provisional Application No. 60/276,498, filed Mar. 19, 2001, under 35 U.S.C. Section 119. This application is also a continuation-in-part of U.S. Ser. No. 10/687,432, filed Oct. 16, 2003.

BACKGROUND OF THE INVENTION

1. Field of the Invention

This invention is related in general to the field of microscopy. In particular, it relates to a novel approach for acquiring multiple image swaths of a large sample area using an array microscope and subsequently combining the swaths to form a good-quality high-resolution composite image.

2. Description of the Related Art

Typical microscope objectives suffer from the inherent limitation of only being capable of imaging either a relatively large area with low resolution or, conversely, a small area with high resolution. Therefore, imaging large areas with high resolution is problematic in conventional microscopy and this limitation has been particularly significant in the field of biological microscopy, where relatively large samples (in the order of 20 mm×50 mm, for example) need to be imaged with very high resolution. Multi-element lenses with a large field of view and a high numerical aperture are available in the field of lithography, but their cost is prohibitive and their use is impractical for biological applications because of the bulk and weight associated with such lenses.

A recent innovation in the field of light microscopy provides a solution to this problem using a new type of array microscope. As described in commonly owned U.S. Pat. No. 7,184,610, herein incorporated by reference, this new array microscope consists of an array of miniaturized microscopes wherein each includes a plurality of optical elements individually positioned with respect to a corresponding image plane and configured to image respective sections of the sample object. As illustrated in FIG. 1, the array further includes a plurality of image sensors corresponding to respective optical elements and configured to capture image signals from respective portions of the object. The absolute magnification in an array microscope is greater than one, which means that it is not possible to image the entire object surface at once even when it is equal to or smaller than the size of the array. Rather, the imaged portions of the object are necessarily interspaced in checkerboard fashion with parts of the object that are not imaged. Accordingly, this array microscope was designed in conjunction with the concept of linear object scanning, where the object is moved relative to the array microscope and data are acquired continuously from a collection of linear detectors. Data swaths obtained from individual optical systems are then concatenated to form the composite image of the object.

In such an array microscope, a linear array of miniaturized microscopes is preferably provided with adjacent fields of view that span across a first dimension of the object and the object is translated past the fields of view across a second dimension to image the entire object. As illustrated in FIG. 2, because each miniaturized microscope 10 is larger than its field of view 12 (having, for example, respective diameters of about 1.8 mm and 200 μm—only one is shown for simplicity), the individual microscopes of the imaging array are staggered in the direction of scanning (x direction in the figure) so that their relatively smaller fields of view are offset over the second dimension but aligned over the first dimension. As a result of such staggered arrangement of the rows of miniaturized microscopes, the continuous swaths covered by the linear scan of each optical system is substantially free of overlap with the continuous swaths covered by adjacent optical systems. At each acquisition frame each miniaturized microscope projects image data for a small section of the sample object directly onto a detector and the individual frame data are then used to form an image of the entire sample object by hardware or software manipulation.

The axial position of the array with respect to the sample object is preferably adjusted to ensure that all parts of the sample surface are imaged in a best-focus position. Thus, the detector array provides an effectively continuous coverage along the first dimension which eliminates the need for mechanical translation of the microscope in that direction, providing a highly advantageous increase in imaging speed by permitting complete coverage of the sample surface with a single scanning pass along the second dimension. Such miniaturized microscopes are capable of imaging with very high resolution. Therefore, large areas are imaged without size limitation and with the very high resolution afforded by the miniaturized microscopes.

In a similar effort to provide a solution to the challenge of imaging large areas with high magnification, U.S. Pat. No. 6,320,174 (Tafas et al.) describes a system wherein an array of optical elements is used to acquire multiple sets of checkerboard images that are then combined to form a composite image of the sample surface. The sample stage is moved in stepwise fashion in relation to the array of microscopes (so called "step-and-repeat" mode of acquisition) and the position of the sample corresponding to each data-acquisition frame is recorded. The various image tiles are then combined in some fashion to provide the object's image. The patent does not provide any teaching regarding the way such multiple sets of checkerboard images may be combined to produce a high-quality high-resolution composite image. In fact, while stitching techniques are well known and used routinely to successfully combine individual image tiles, the combination of checkerboard images presents novel and unique problems that cannot be solved simply by the application of known stitching techniques.

For example, physical differences in the structures of individual miniaturized objectives and tolerances in the precision with which the array of microscopes is assembled necessarily produce misalignments with respect to a common coordinate reference. Moreover, optical aberrations and especially distortion and chromatic aberrations, as well as spectral response and gain/offset properties, are certain to vary from microscope to microscope, thereby producing a checkerboard of images of non-uniform quality and characteristics. Therefore, the subsequent stitching by conventional means of multiple checkerboards of image tiles acquired during a scan cannot produce a high-resolution composite image that precisely and seamlessly represents the sample surface.

For instance, as illustrated in FIG. 3, assume that a conventional step-and-repeat array microscope of the type described by Tafas et al. includes only two adjacent miniaturized microscopes producing respective images 14 and 16 and that the second microscope introduces a slight rotation and offset in the image 16 acquired from the sample surface 18 with respect to the image 14 acquired by the first microscope (the dashed line represents a perfectly aligned image). In such case the acquisition of the first frame of image tiles 14,16 would produce a pattern similar to that illustrated in the figure. The acquisition of the second frame of image tiles 14' and 16' would produce a similarly misaligned set of images, as illustrated.

If conventional stitching procedures are used to combine the various image tiles so acquired, such as described in U.S. Pat. Nos. 5,991,461 and 6,185,315, the stitching of images 14 and 14' will produce a seamless image of uniform quality accurately representing the corresponding section of the sample surface 12. This is because both images 14 and 14' result from data acquired with the same miniaturized microscope and the same spectral response, gain, offset, distortion and chromatic aberrations (to the extent they have not been removed by correction) apply to both images, thereby producing a composite image of uniform quality. Inasmuch as stitching procedures exist that are capable of correcting misalignments between adjacent image tiles, a similar result could be obtained by stitching images 16 and 16'.

The combination of images acquired with different microscopes, however, could not be carried out meaningfully with conventional stitching techniques. Combining image 14' with image 16, for example, may be possible as far as misalignments and offsets are concerned, but the combined difference could still be non-uniform with respect to spectral response, gain, offset, and distortion or chromatic aberrations (depending on the characteristics of each miniaturized microscope). Therefore, the overall composite image could represent a meaningless assembly of incompatible image tiles that are incapable of producing an integrated result (like combining apples and oranges).

Thus, the prior art does not provide a practical approach to the very desirable objective of imaging a large area with an array microscope in sequential steps to produce checkerboards of images that can later be combined in a single operation simply by aligning any pair of adjacent image tiles. Similarly, the prior art does not provide a solution to the same problem of image non-uniformity produced by the array microscope of U.S. Pat. No. 7,184,610 that is scanned linearly over a large area of the sample surface to produce image swaths that are later combined to form a composite image.

U.S. Pat. No. 5,768,443 (Michael et al.) describes a method for coordinating the fields of view of a multi-camera machine by pre-calibrating each camera for distortion to develop a distortion-correction map, applying the correction to images acquired simultaneously with each camera, and combining the corrected images to produce a composite image. While the Michel patent does not relate to microscopes, it provides a useful approach to solving the problem addressed by the present invention. This invention provides a general and efficient solution toward this end using the linear-scan array microscope of U.S. Pat. No. 7,184,610.

BRIEF SUMMARY OF THE INVENTION

In view of the foregoing, the invention is described for simplicity with reference to an array microscope operating in step-and-repeat scanning mode, but it is applicable to every situation where an array microscope is used to generate images of portions of a large sample area to be subsequently combined to image the whole area. In fact, the preferred imaging apparatus consists of multiple optical systems arranged into an array capable of simultaneously imaging a portion of an object with a single linear scan in the manner described in U.S. Pat. No. 7,184,610.

In order to enable the combination of the various multi-image frames acquired during a scan in a seamless manner to compose a large-area image with uniform and significant features, the performance of each microscope is normalized to the same reference base for each relevant optical-system property. Specifically, a correction-factor matrix is developed through calibration to equalize the spectral response measured at each detector and preferably also to similarly balance the gains and offsets of the detector/light-sources associated with the various objectives, to correct for geometric misalignments between microscopes, and to correct distortion, chromatic, and other aberrations in each objective.

Thus, by applying the resulting correction-factor matrix to the data acquired by scanning the sample object in any fashion, the resulting checkerboard images are normalized to a uniform basis so that they can be concatenated or combined by stitching without further processing. As a result of this normalization process, the concatenation or stitching operation can be advantageously performed rapidly and accurately for the entire composite image simply by aligning pairs of adjacent images from the image checkerboards acquired during the scan. A single pair of images from each pair of checkerboards is sufficient because the remaining images are automatically aligned as well to produce a uniform result by virtue of their fixed spatial position within the checkerboard.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 1:
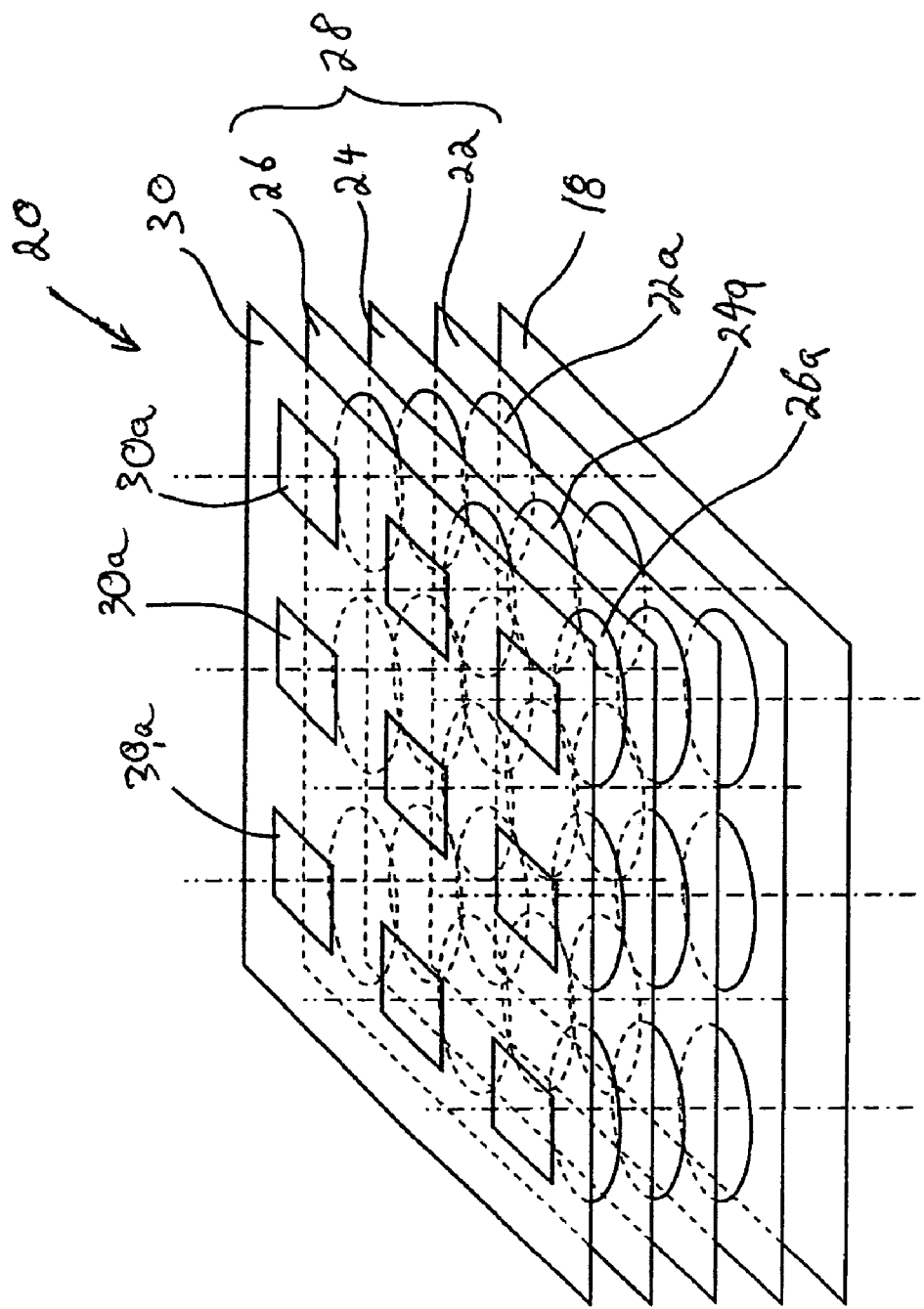
FIG. 1 illustrates the basic configuration of an array microscope composed of several individual optical elements formed on rectangular grids aligned along common optical axes.

The invention was motivated by the realization that the images produced by data acquisition using an array microscope cannot be combined directly to produce a uniform composite image because of the unavoidable data incompatibilities produced by discrepancies in the optical properties of the various miniaturized microscopes in the array. The heart of the invention lies in the idea of normalizing such optical properties to a common basis, so that functionally the array of microscopes performs, can be viewed, and can be treated as a single optical device of uniform characteristics. As a result, each set of multiple images produced simultaneously at each scanning step can be viewed and treated as a single image that can be aligned and combined in conventional manner with other sets in a single operation to produce the composite image of a large area. The advantages of the invention are particularly useful when the array microscope is utilized with linear scanning and image swaths are concatenated or stitched together.

As used herein, the term "checkerboard" refers, both in relation to step-and-repeat scanning and linear scanning, to image frames corresponding to portions of the sample object interspaced in checkerboard fashion with parts of the object that are not imaged. The term "microscope" is used with reference to both the array microscope and the individual miniaturized microscopes within the array, and it is assumed that the distinction will be apparent to those skilled in the art from the context of the description. The term "field of view" is similarly applied to both. The term "axial" is intended to refer to the direction of the optical axis of the array microscope used for the invention. "Step-and-repeat" is used to refer to a data acquisition mode wherein frames of data are taken during a scan by translating the object or the microscope in stepwise fashion and by acquiring data statically between steps. With reference to data acquisition, the term "frame" is used to refer to the simultaneously acquired data obtained at any time when the system's sensor or sensors operate to acquire data. The term "tile" refers both to the portion of the sample surface imaged by a single miniaturized microscope in an array and to the image so produced. The terms "swath" and "image swath" refer to the image produced by each individual objective in an array microscope of the type described in U.S. Pat. No. 7,184,610 as a result of a single linear scan, each swath producing the image of a corresponding strip of object surface equal in width to the field of view of the individual objective and in length to the span of the linear scan.

The term "concatenation" refers to the process of joining the tile or swath images of adjacent portions of the sample surface acquired without field-of-view overlaps, based only on knowledge of the spatial position of each objective in relation to a reference system and the assumption that such knowledge is correct. In contrast to concatenation, the term "stitching" refers to any conventional procedure used to combine separate data sets corresponding to adjacent sections of a sample surface acquired with field-of-view overlaps, wherein the knowledge of the spatial position of each objective is used only as an approximation and such overlaps are used to precisely align the images to form a seamless composite.

Moreover, the terms "geometric alignment," "geometric calibration" and "geometric correction" are used herein with reference to linear (in x, y or z) and/or angular alignment between image tiles produced by an array microscope (distortion), and to chromatic aberration associated with the microscopes in the array. The term "spectral response" refers to the signals registered by the detectors in response to the light received from the imaging process. Finally, the terms "gain" and "offset" variations are used with reference to differences in the electrical response measured at different pixels or on average at different detectors as a function of variations in the current supplied to the light sources, in the background light received by each microscope, in the properties of the optical systems, in the detector pixel responses, in the temperature of the sensors, and in any other factor that may affect gain and offset in an optical/electronic system.

Referring to the drawings, wherein like reference numerals and symbols are used throughout to designate like parts, FIG. 1 illustrates the basic configuration of an array microscope 20 as described in U.S. Pat. No. 7,184,610. The array is composed of several individual optical elements (22a,24a,26a) formed on rectangular plates 22,24,26 (nine elements are illustrated in each grid in the figure). Each microscope includes three lenses distributed along an optical axis passing through the plates 22, 24 and 26. These plates are arranged into a stack 28 aligned with another plate 30 containing area detectors 30a positioned in the image plane of the object surface 18 to be measured. Each area detector 30a consists of many individual sensing elements (pixels) that are preferably implemented with charged-coupled-device (CCD) or complementary-metal-oxide-semiconductor (CMOS) arrays, or any other suitable image sensing device.

As illustrated, this embodiment is characterized by a one-to-one correspondence between each optical system and an area detector. Thus, the field of view of each detector projected through the optical system yields a rectangular image (as shaped by the detector) received in the image plane of the object. At each given acquisition time, the individual optical systems (objectives) of the array form the image of a portion of the object surface on the corresponding detector. These images are then read out by suitable electronic circuitry (not shown) either simultaneously or in series.

Figure 4:
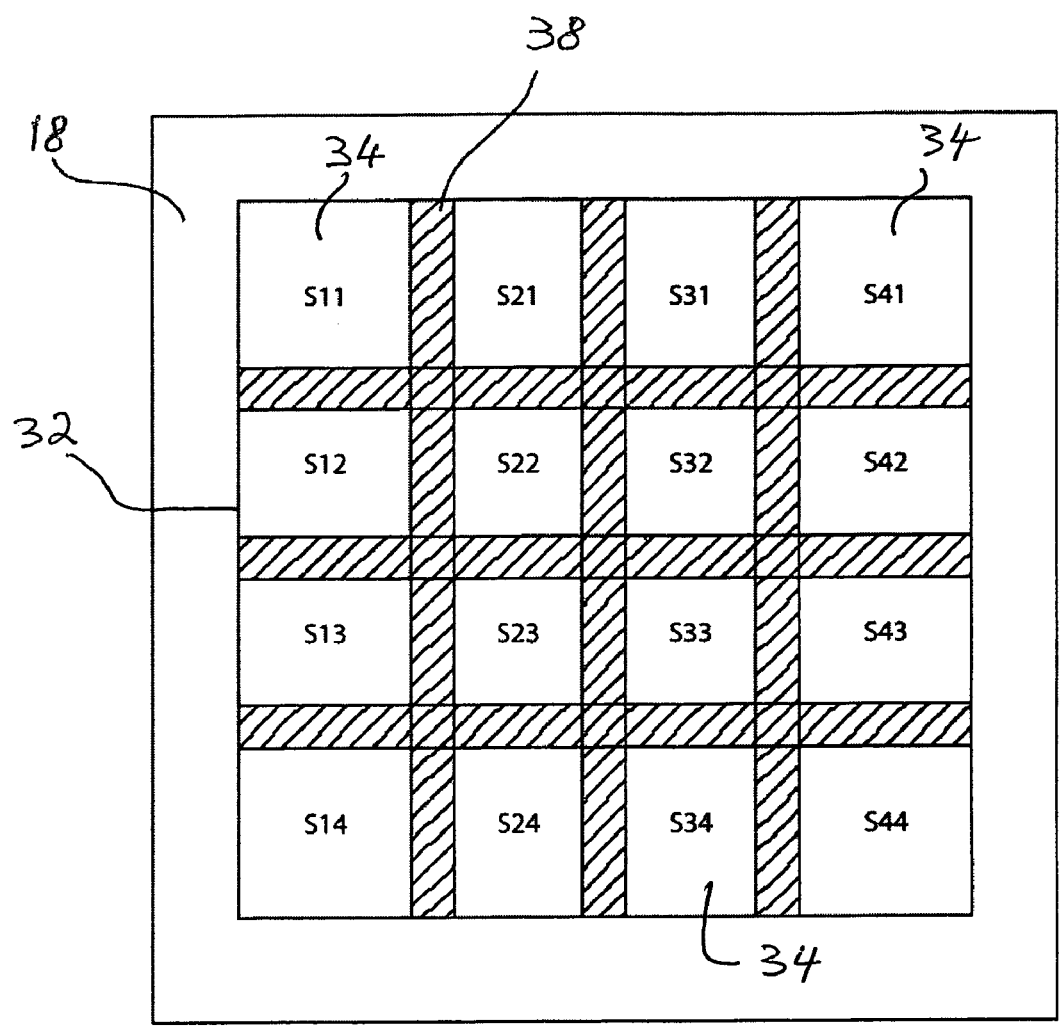
FIG. 4 illustrates a large area of an object surface covered by the field of view of an objective scanning in overlapping fashion through a step-and-repeat process.

FIG. 4 illustrates, using step-and-repeat scanning for convenience of illustration, a strategy that can be used advantageously to acquire high-resolution images of an object area 32 larger than the field of view covered by the microscope objectives. As mentioned above, when greater-than-one absolute magnification is involved, it is not possible to image the entire object surface at once because of the physical constraints imposed by the size of the objectives. Therefore, it is necessary to repeat the acquisition of data at locations of the object that have not been previously imaged. The various tiles 34 of data are then combined in a concatenating or a stitching operation that requires a large number of images to be taken and stored. When done conventionally, the process takes significant time because for each data frame the object must be positioned in front of the optical system and often also focused before acquisition.

Such repetitive procedure is not practical (or sometimes even possible) with conventional microscopes because of their size. The typical field of view of a 40H microscopic objective is about 300 im with a lens about 20 mm in diameter. Therefore, even an array of conventional microscopes (such as described in U.S. Pat. No. 6,320,174) could not image more than a single tile at a time on an object surface of about 20×20 mm or less in size. By comparison, the field of view of each individual optical system in an array of miniaturized microscopes is comparable in size (i.e., about 200 μm), but the distance between optical systems can be as small as 1.5 mm. Thus, the diameter to field-of-view ratio in array microscopes is about 7.5 while in conventional optical microscopes it is in the order of about 65. As a result, array microscopes are most suitable for acquiring simultaneously multiple images of portions of the sample object in checkerboard fashion. Because imaging by the various miniaturized objectives is performed in parallel, multiple tiles are imaged at the same time at each scanning step. This can be done by translating the array microscope with respect to the object (or vice versa) on some predetermined step pattern.

Figure 5:
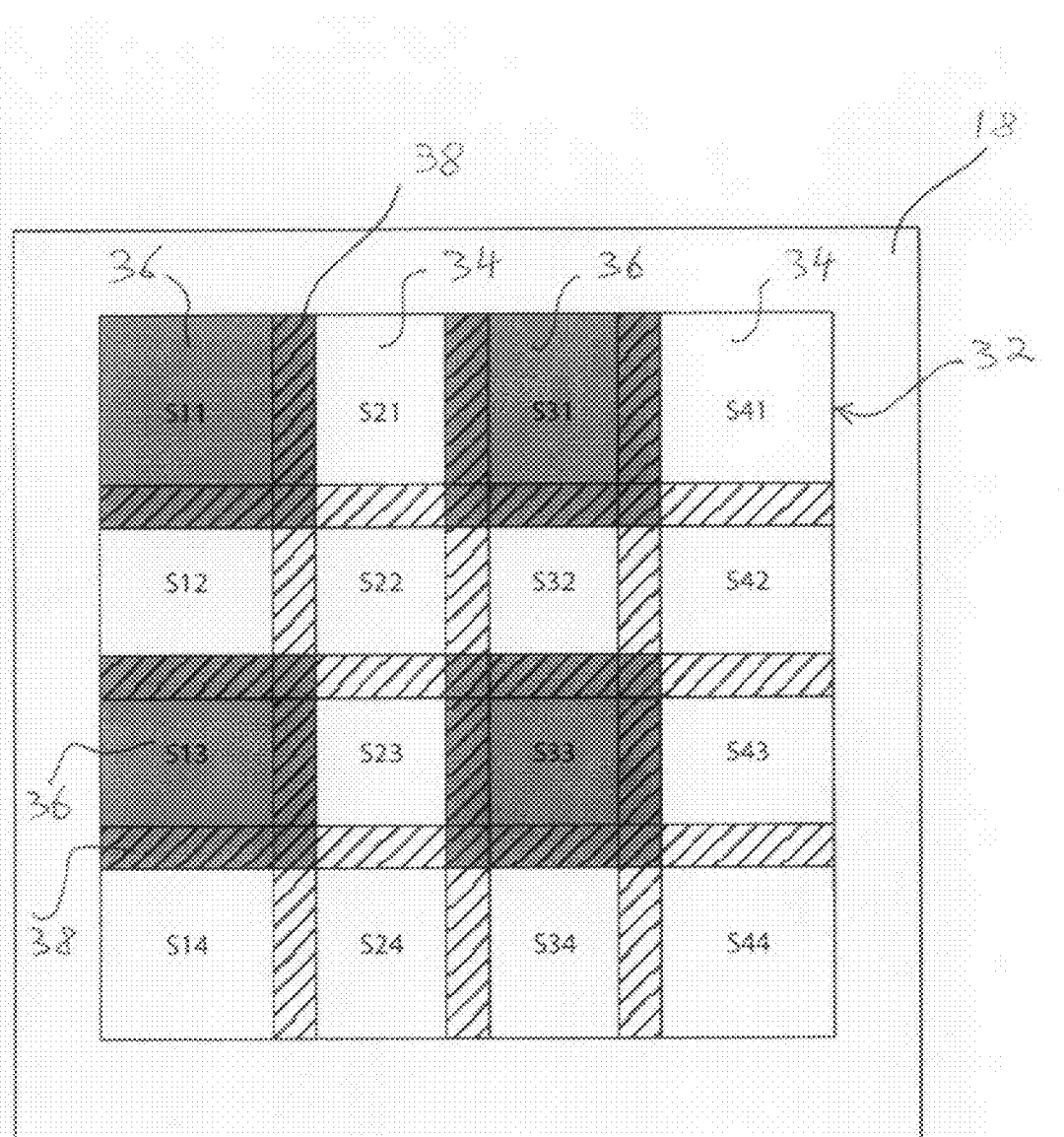
FIG. 5 illustrates the large area of FIG. 4 covered by the fields of view of individual objectives of a four-element array microscope at an initial scanning position.
Figure 7:
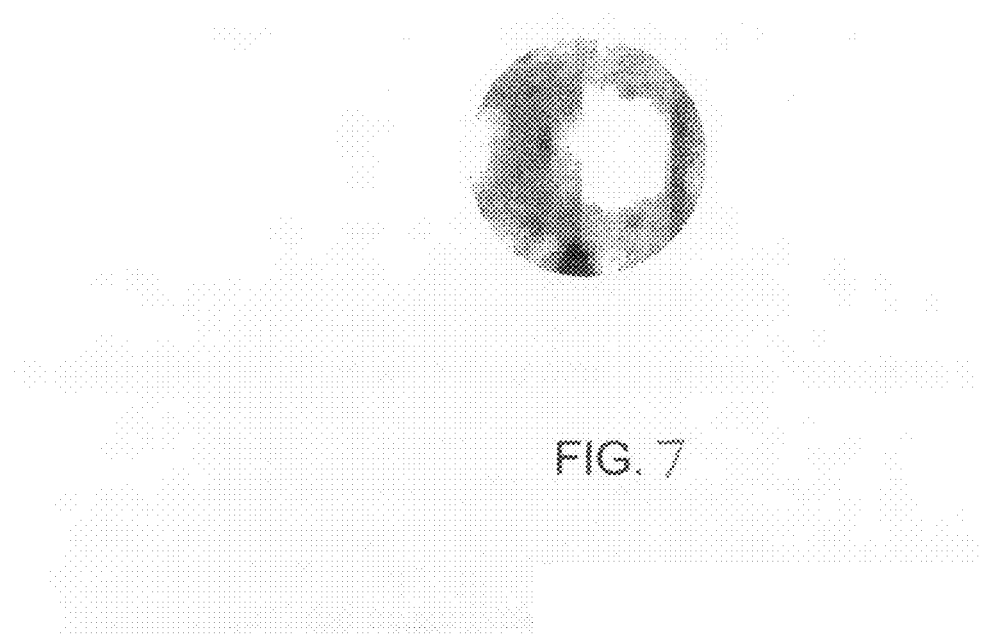
FIG. 7 is an enlarged view of a section in the overlap region between adjacent tiles that clearly illustrates the distortion error of FIG. 6, as exhibited by the vertical discontinuities in the data.

For example, the areas 36 shaded in gray in FIG. 5 would correspond to image tiles of corresponding portions of the object surface 32 assuming that the array microscope had four optical systems with fields of view spaced apart on the object plane by a distance substantially equal to the field of view of each individual microscope (in this example a distance to field-of-view ratio of about 2 is assumed to simplify the illustration). In fact, a smaller distance is often required in practice to allow sufficient overlaps (the cross-hatched areas 38, magnified in the figure for clarity of illustration) during the acquisition steps to account for scanning misalignments and/or to acquire duplicate data that facilitate the subsequent stitching of adjacent tiles. While a typical step-and-repeat procedure with a single microscope requires as many acquisition frames as the number of tiles 34 necessary to cover the overall imaged area 32, the use of an array microscope makes it possible to reduce the frames by a factor equal to the number of objectives aggregated in the array. In the example shown in FIGS. 4 and 5, a total of sixteen individual tiles would be necessary to reconstruct the entire object surface. Thus, using a conventional microscope, sixteen acquisitions would be required. Using an array microscope with four optical systems, it is instead possible to acquire four tiles simultaneously at each step and the entire surface can be imaged in just four steps. In the first step, the images corresponding to fields of view S11, S13, S31 and S33 are acquired; followed by S21, S41, S23 and S43; then S22, S42, S24 and S44; and finally S12, S32, S14 and S34. The four checkerboard frames of images so acquired are then concatenated or stitched together to form the composite image of the object surface.

As described, in order to enable the composition of a seamless, meaningful image of the large area for which data have been acquired, the system is calibrated according to the invention and the results of calibration are applied to the frames of data prior to stitching or concatenation. According to one aspect of the invention, the device is first calibrated to establish the relative position and the magnification (pixel spacing) of each field of view at imaging color bands (RGB) and corrective factors are then applied to align all image tiles (with respect to a fixed coordinate system) and to produce uniform magnification across the array microscope. That is, the system is corrected for aberrations commonly referred to in the art as distortion and chromatic aberration. Such calibration may be accomplished, for example, using prior knowledge about the geometry of the system or using standard correlation methods. In the former case, each tile's image is reconstructed, if necessary, according to such prior knowledge by applying geometric transformations (such as rotation, scaling, and/or compensation for distortion) designed to correct physical non-uniformities between objectives and optical aberrations within each objective. The images are then concatenated or stitched to create a composite image.

Because of the simultaneous acquisition of each checkerboard set of images (S11, S13, S31 and S33, for example), the geometric relationship between individual optical systems in the array is preserved between acquisition frames. Therefore, this fixed relationship can be used advantageously to materially speed up the image combination process. Since the physical relationship between checkerboard images does not change between frames, once normalized according to the invention, the sequence of frames can be concatenated or stitched directly without further processing subject only to alignment to correct scanning positioning errors. Thus, using conventional stitching methods to seamlessly join two adjacent tile images acquired in consecutive steps (S11 and S21, for example), the rest of the tile images (S13,S31,S33 and S23,S41,S43) can be placed directly in the composite image simply by retaining their relative positions with respect to S11 and S21, respectively.

As part of the calibration procedure, this relationship can be established by imaging a reference surface or target through which the position and orientation of each field of view can be uniquely and accurately identified. One such reference surface could be, for example, a flat glass slide with a pattern of precisely positioned crosses on a rectangular grid that includes a linear ruler with an accurate scale. Such a reference target can be easily produced using conventional lithography processes with an accuracy of 0.1 μm or better. Using a large number of individual target points for the calibration procedure can further increase the accuracy.

The lateral position, angular orientation, and distortion of each optical system and detector can be accurately measured by determining the positions of reference marks (such as points on the crosses) within the field of view of each image and by comparing that information with the corresponding positions of those marks in the reference surface based on the ruler imprinted on it. The differences are converted in conventional manner to correction factors that can then be used to correct image errors due to the geometric characteristics of the array microscope. As a result, linear and angular misalignment of the various fields of view in the array can be corrected to establish the exact position of each tile within the overall composite image. Once so established, such correction factors can be incorporated in firmware to increase the processing speed of the optical system.

Alternatively, correlation methods can be used that rely only on an approximate knowledge about the position of each individual image in the checkerboard of fields of view. Using these techniques, the exact position of each tile is established by matching two overlapping sections of images of adjacent portions of the object (taken at different frames). This can be done in known manner using, for instance, a maximum cross-correlation algorithm such as described by Wyant and Schmit in "Large Field of View, High Spatial Resolution, Surface Measurements," Int. J. Mach. Tools Manufact. 38, Nos. 5-6, pp. 691-698 (1998). Thus, this approach requires an overlap between adjacent fields of view, as illustrated in FIGS. 4 and 5. Typical overlaps are on the order of 10% of the tile size.

It is noted that typical optical systems used in imaging produce an inverted image; that is, the orientation of the x and y axes of the object are opposite in sample surface and in the image. Therefore, in their raw form these images cannot be used to construct a composite image. Rather, before either concatenation or stitching of the various tiles is carried out, each image needs to be inverted to match the orientation of the object. This operation can be done in conventional manner either in software or hardware.

Figure 6:
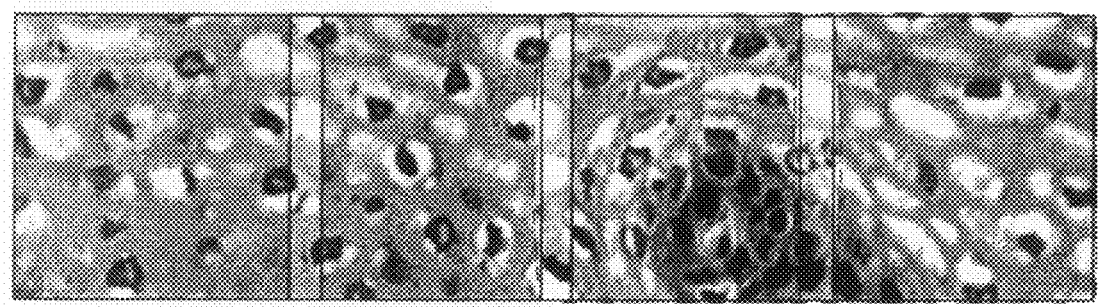
FIG. 6 is the image produced by scanning a sample area with an array microscope in step-and-repeat mode without correction for distortion.
Figure 8:
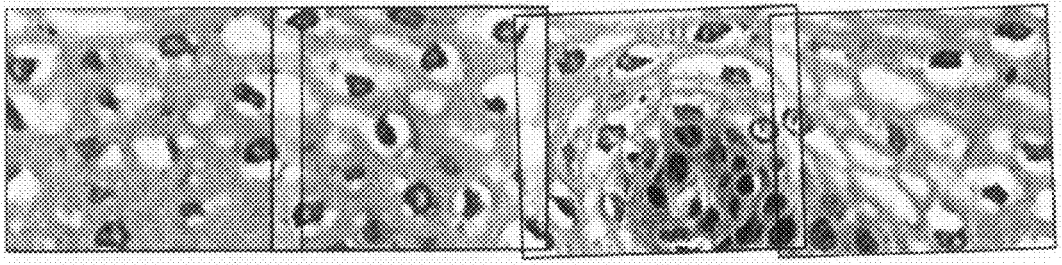
FIG. 8 is the image produced by scanning the same sample of FIG. 6 without correction for geometric misalignments between the two microscopes.
Figure 9:
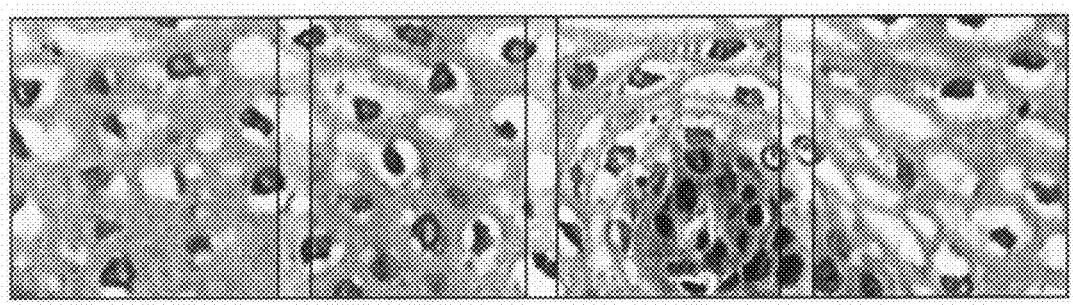
FIG. 9 is the image produced with the same sample data after calibration of the array microscope for geometric uniformity, as described, and the subsequent application of the resulting correction factors to the raw image data.

FIGS. 6, 7, 8 and 9 illustrate the positive results produced by the geometric-calibration procedure of the invention. FIG. 6 shows the image produced by scanning a sample area with a two-microscope array (the example is limited to two tiles for simplicity) in step-and-repeat mode (only two frames are illustrated) without correction for distortion. The distortion error introduced by the right-hand microscope is illustrated in dashed line next to the ideal distortion-free fields of view characterized by the overlapping solid-line rectangles. The distortion is more clearly visible in the enlarged view of FIG. 7, which corresponds to a section of the overlap region wherein the distortion error produces vertical discontinuities in the data. FIG. 8 is the image produced by scanning the same sample without correction for geometric misalignments between the two microscopes. The angular error introduced by the right-hand microscope is illustrated by the corresponding tilted fields of view. FIG. 9 is the image produced with the same sample data after calibration of the array microscope for geometric uniformity, as described, and the subsequent application of the resulting correction factors to the raw image data. In all cases the checkerboard images corresponding to each acquisition frame were aligned and stitched together applying the maximum cross-correlation algorithm to a single pair of adjacent image tiles.

According to another aspect of the invention, the device is calibrated to establish a uniform spectral response across the array microscope. That is, correction factors are generated to normalize the spectral response of each detector in the array. When images belonging to different fields of view are acquired using separate detectors and/or light sources, there is a possibility of variation in the spectral responses obtained from the various detectors. These differences may stem, for example, from light sources illuminating different fields of view at different temperatures, or from different ages of the light bulbs, or from different filter characteristics, etc. These differences also need to be addressed and normalized in order to produce a composite image of uniform quality, especially when the images are subject to subsequent computer analysis, such as described in U.S. Pat. No. 6,404,916. Similar differences may be present in the spectral response of the detectors as a result of variations in the manufacturing process or coating properties of the various detectors.

A suitable calibration procedure for spectral response to establish correction factors for each field of view may be performed, for example, by measuring the response to a set of predefined target signals, such as calibrated illumination through color filters. For each field of view the response to red, green and blue channels can be calculated using any one of several prior-art methods, such as described in W. Gross et al., "Correctability and Long-Term Stability of Infrared Focal Plane Arrays", Optical Engineering, Vol. 38(5), pp. 862-869, May 1999; and in A. Fiedenberg et al., "Nonuniformity Two-Point Linear Correction Errors in Infrared Focal Plane Arrays," Optical Engineering, Vol. 37(4), pp. 1251-1253, April 1998. The images acquired from the system can then be corrected for any non-uniformity across an individual field of view or across the entire array. As one skilled in the art would readily understand, correction factors may be implemented in the form of look-up tables or correction curves applied to the acquired images. The correction for differences in the spectral response can be carried out on the fly through computation during data acquisition, such as by using a programmable hardware device. Alternatively, the correction may be implemented structurally by modifying the light-source/detector optical path to produce the required compensation (for example, by inserting correction filters, changing the temperature of the light source, etc.).

It is understood that all these procedures aim at producing a uniform spectral response in each acquisition system, such that no variation in the image characteristics is produced as a result of device non-uniformities across the entire composite image. Therefore, in case when such a corrective procedure is not carried out prior to the formation of the composite image, the spectral-response characteristics of each field of view should be used in post-imaging analysis to compensate for differences. As one skilled in the art would readily understand, these corrections can also be applied to a detector as a whole or on a pixel-by-pixel basis.

Figure 10:
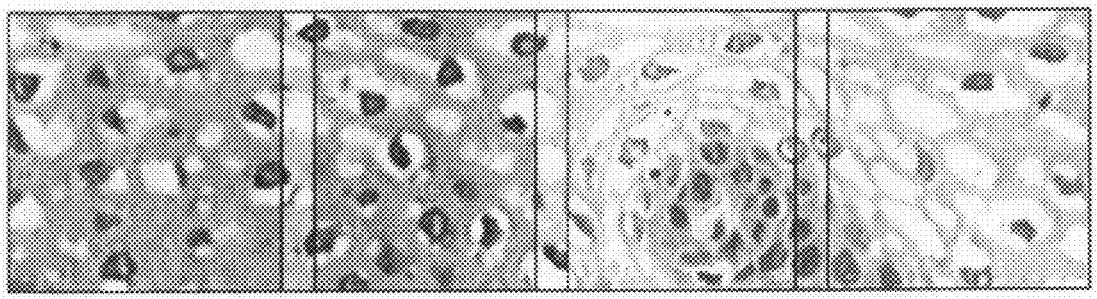
FIG. 10 is an image produced by scanning the same sample of FIG. 6 without correction for spectral-response uniformity between the two microscopes.
Figure 11:
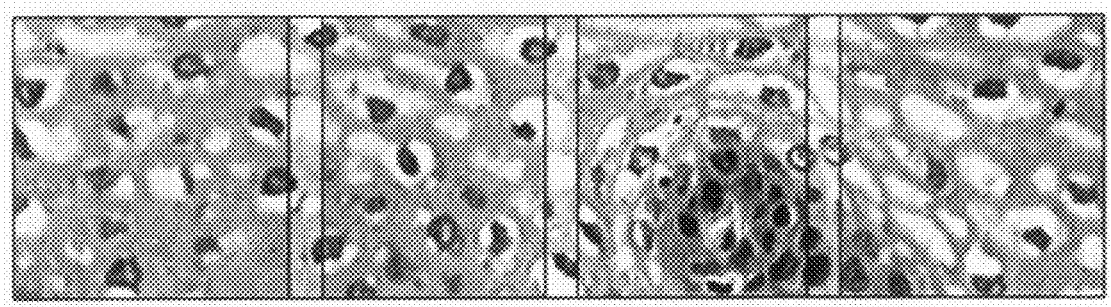
FIG. 11 is the image produced with the same data of FIG. 8 after calibration of the array for spectral-response uniformity according to the invention and the subsequent application of the resulting correction factors to the raw image data.

FIGS. 10 and 11 illustrate the positive results produced by the spectral-response calibration procedure of the invention. FIG. 10 is an image produced by scanning a sample area with a two-microscope array in step-and-repeat mode without correction for differences in spectral response. The figure shows that the left and right microscopes exhibit a relatively higher spectral response to red and green, respectively (which produce darker and lighter pictures, respectively, in black and white). FIG. 11 is the corresponding image produced with the same data after calibration of the array for spectral-response uniformity, as described, and the subsequent application of the resulting correction factors to the raw image data. The correction factors were calculated for each pixel of each field of view in response to red, green and blue channels using the methods described in W. Gross et al. and A. Fiedenberg et al., supra.

According to yet another aspect of the invention, the device is calibrated to establish a uniform gain and offset response across the array microscope. Because of variations in the currents supplied to the light sources to the various optical systems, in the optical properties of the systems, in the detector pixel responses, in the temperatures of the sensors, etc., the combined response of the instrument to light may vary from pixel to pixel and from one field of view to another. Such variations are manifested in the composite image as sections with different properties (such as brightness and contrast). In addition, such non-uniform images may cause different responses to each field of view to be obtained when automated analysis tools are used. Therefore, it is important that these variations also be accounted for by calibration, which can be achieved by measuring the response produced by a know target to generate a set of gain and offset coefficients. For example, a known target is placed in the field of view of each optical system (such a target could be a neutral-density filter with known optical density). A series of images is taken for different optical density values. Based on these measurements, the gain and offset of each pixel in each field of view are calculated using one of several well known procedures, such as outlined in W. Gross et al. and A. Fiedenberg et al., supra. Appropriate correction coefficients are then computed to normalize the image properties of each pixel (or on average for a field of view) so that the same gain/offset response is measured across the entire set of fields of view. A single target gain and a single target offset may be used to normalize the response of the detector/light-source combination at two signal levels and, assuming linear behavior, the resulting correction factors may be used between those levels. Correction factors for additional linear segments of signal levels may be similarly computed, if necessary, to cover a greater signal intensity span.

Figure 12:
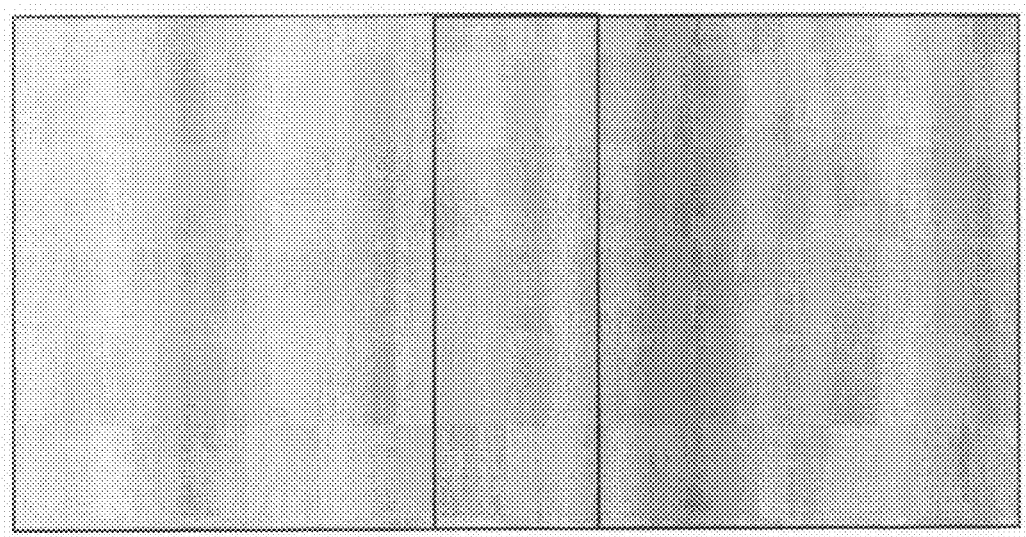
FIG. 12 is an image produced by scanning a sample area with an array microscope in step-and-repeat mode without correction for differences in detector gain and offset.
Figure 13:
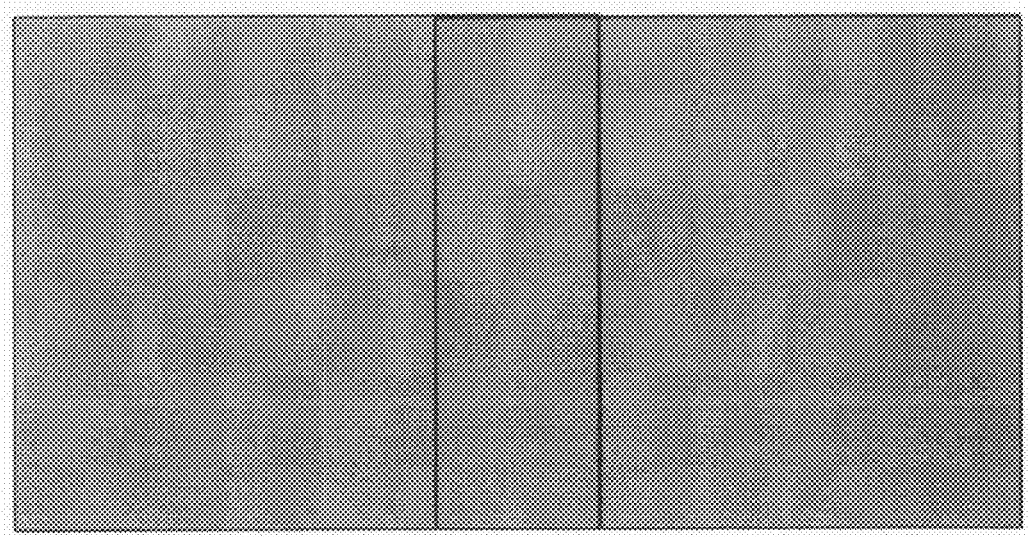
FIG. 13 is an image produced with the same data of FIG. 12 after calibration of the array for gain and offset uniformity according to the invention and the subsequent application of the resulting correction coefficients to the raw image data.

FIGS. 12 and 13 illustrate the improvements produced by the gain/offset calibration procedure of the invention. FIG. 12 is an image produced by scanning a uniform-background sample area with the same array microscope in step-and-repeat mode without correction for differences in detector gain and offset. The difference in the intensity registered by adjacent lines of pixels clearly illustrates non-uniformity in the response of the various detector pixels. FIG. 13 is the corresponding image produced with the same data after calibration of the array for gain and offset uniformity according to the invention, as described, and the subsequent application of the resulting correction coefficients to the raw image data. The correction coefficients were calculated for each pixel of each field of view using the procedure described in W. Gross et al. and A. Fiedenberg et al., supra.

Obviously, all three kinds of corrections described herein may be, and preferably are, implemented at the same time on the image data acquired to produce a composite image. To the extent that normalizing corrections are implemented through linear transformations, a cumulative matrix of coefficients can be calculated and used to effect one, two or all three kinds of corrections. In addition, as mentioned above, a composite image can be constructed using either a concatenation or a stitching technique. The first method is preferred because of its speed, but it is also much more difficult to implement in step-and-repeat mode because the exact position of each tile in the patchwork of images (or checkerboards) acquired in successive frames with an array microscope needs to be known with an accuracy better than the sampling distance. Thus, in order to improve the knowledge about the relative position of each field of view at each frame, the image acquisition is preferably carried out at the same instant for all detectors in the array microscope device. This requires a means of synchronization of all detectors in the system. One approach is to use one of the detectors as a master and the rest of detectors as slaves. Another approach is to use an external synchronization signal, such as one coupled to a position sensor for the stage, or a signal produced by stroboscopic illumination, or one synchronized to the light source.

Alternatively, a less precise knowledge about the position of each field of view can be combined with conventional stitching techniques to construction of the composite image. Each checkerboard of images acquired simultaneously at each frame can be used as a single image because the geometric relationship between the images is preserved during the stitching process. Thus, each checkerboard frame is seamlessly fused with adjacent ones in the composite image simply by applying conventional stitching (such as correlation techniques) to a single pair of adjacent images, knowing that the remaining images remain in fixed relation to them. Such technique can significantly speed up the process of overall image construction when the exact position of each checkerboard in the composite image is not known.

The procedure herein disclosed gives good results for objects that are flat within the depth of field of the individual optical systems. For objects that extend beyond such depth of field, additional refocusing may be required. This can be done most conveniently using an array microscope where each of the optical systems can be focused independently. Another way to compensate for variations in object height is to use a cubic phase plate, as described in U.S. Pat. No. 6,069,738.

Figure 2:
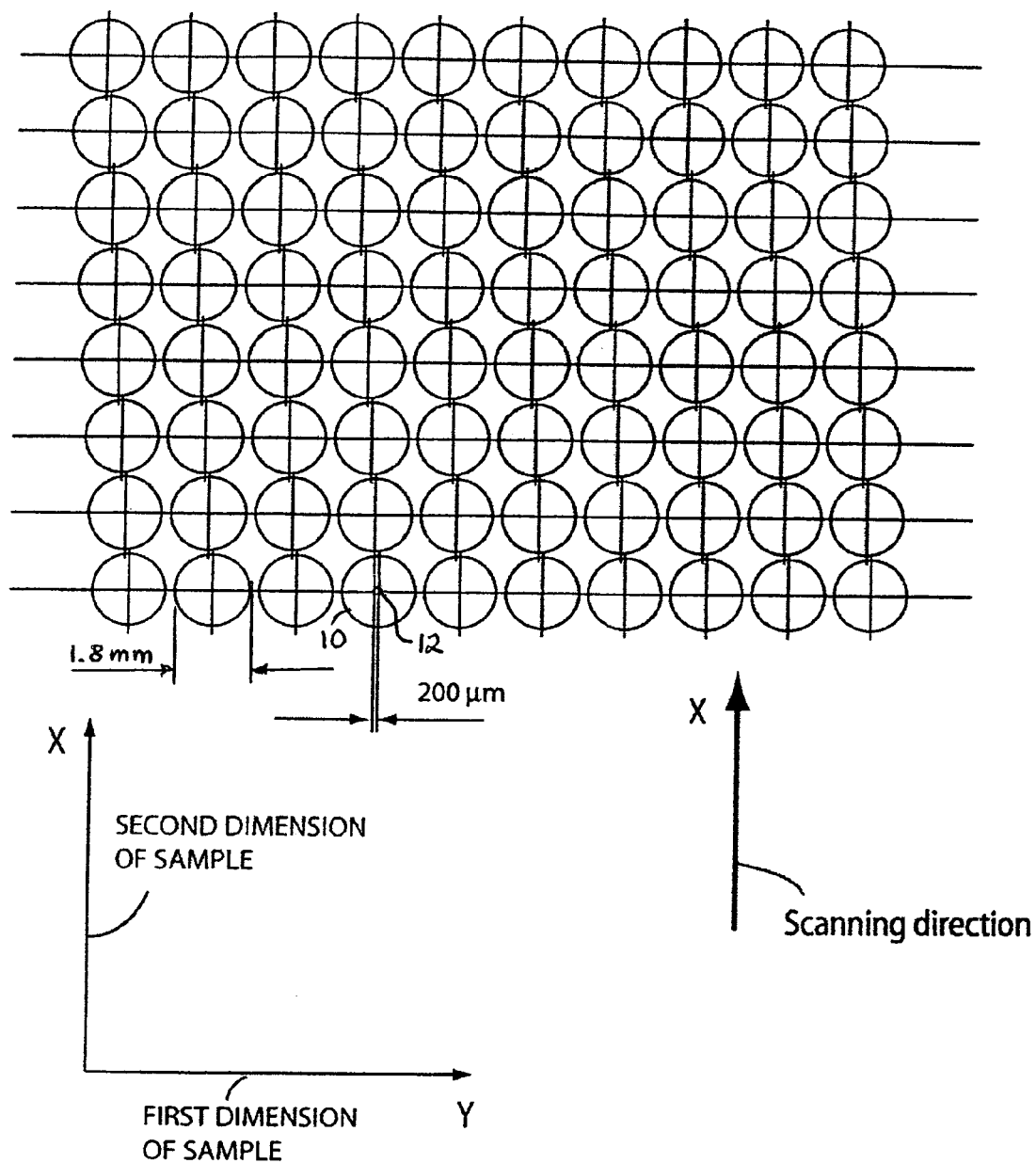
FIG. 2 is a simplified schematic representation of the fields of view in an array-microscope layout of 99 miniaturized microscopes in an array of 9 rows of individual microscopes disposed transversely and 11 columns of microscopes disposed at a slight angle with respect to the direction of scanning, such that a complete coverage of the sample surface is achieved with a single linear scan.
Figure 3:
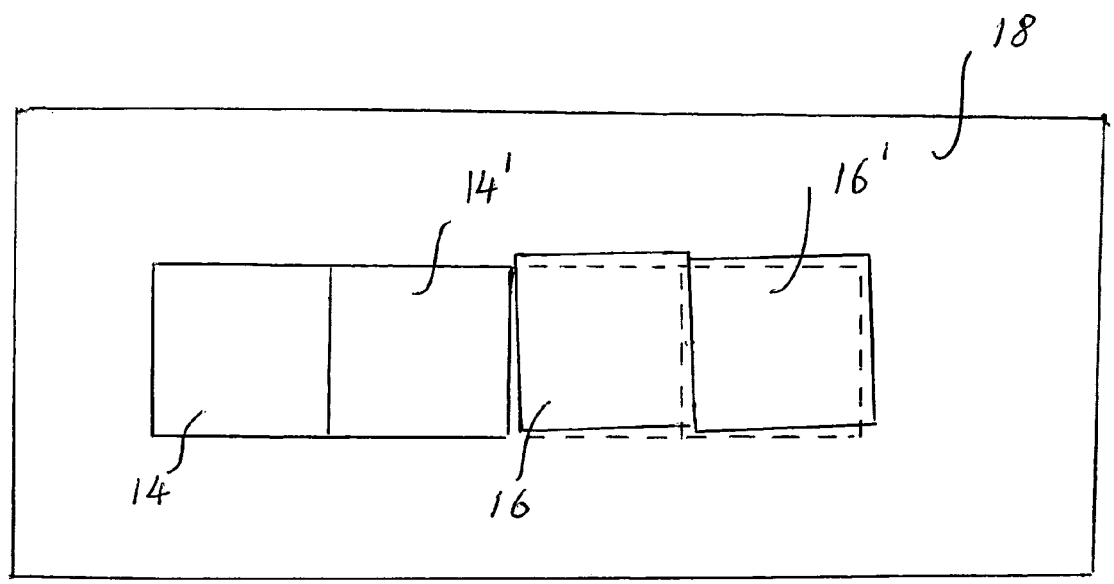
FIG. 3 is a simplified schematic representation of the images produced by a two-microscope array at two acquisition frames taken after the sample is moved by a predetermined amount designed to cover a sample area larger than the field of view of the array microscope. The figure illustrates a physical misalignment in the image produced by the second microscope with respect to the image produced by the first microscope.
Figure 16:
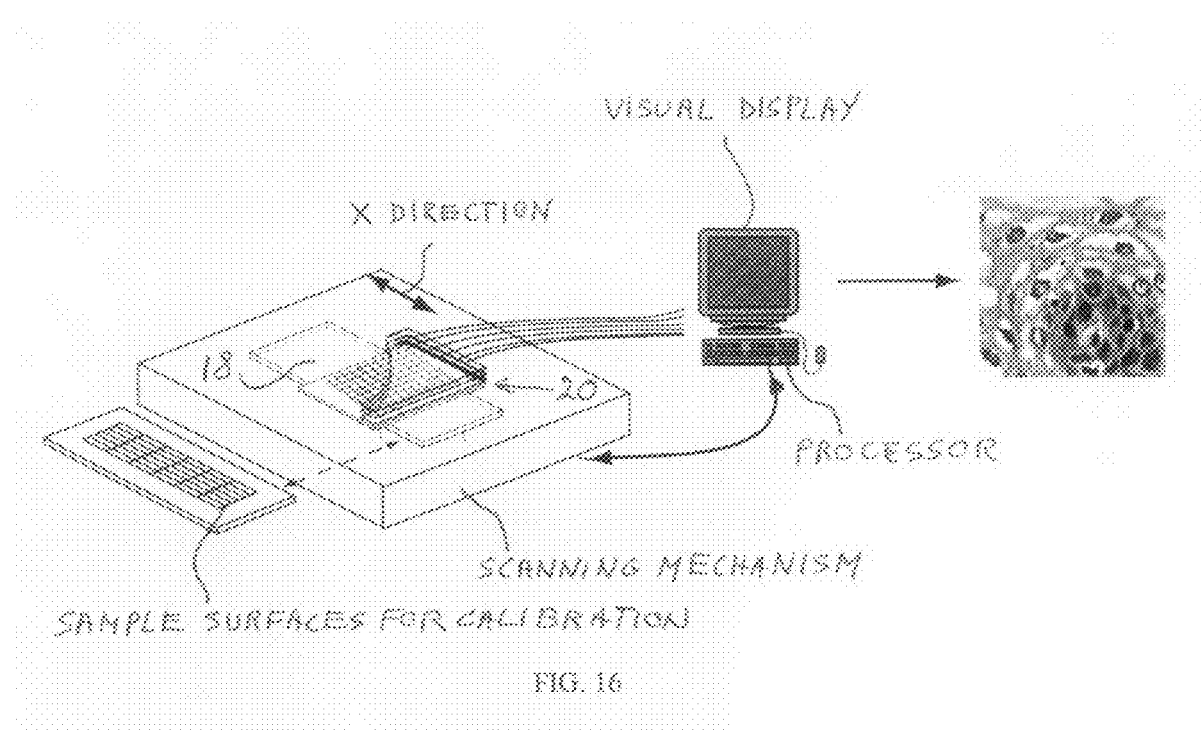
FIG. 16 illustrates a current embodiment of the linear scanning array microscope preferred to practice the invention.

It is noted that the invention has been described for convenience in terms of an array microscope adapted to scan in step-and-repeat fashion, but the invention is particularly advantageous when applied to an array microscope configured to scan linearly entire the length of the object surface, as described in U.S. Pat. No. 7,184,610 and illustrated in FIG. 16. In such preferred case, the linear array of miniaturized microscopes is provided with adjacent fields of view that span across a first dimension of the object (as illustrated in FIG. 2), and the object is translated past the fields of view across a second dimension to image the entire object. As described above, because each miniaturized microscope is larger than its field of view, the individual microscopes of the imaging array are staggered in the direction of scanning so that their relatively smaller fields of view are offset over the second dimension but aligned over the first dimension. Thus, the detector array provides an effectively continuous linear coverage along the first dimension, which eliminates the need for mechanical translation of the microscope in that direction and provides a highly advantageous increase in imaging speed by permitting complete coverage of the sample surface with a single scanning pass along the second dimension. However, inasmuch as a composite picture is created by combining swaths measured by individual microscopes and associated detectors, the same critical need exists for uniformity in the characteristics of the images acquired across the array.

The great advantage afforded by the microscope array of U.S. Pat. No. 7,184,610 lies in the fact that a single linear scan produces a plurality of image swaths having a width defined by the field of view of each microscope in the array and a length defined by the length of the scan across the object. As a result of this configuration, the image produced by the concatenation of this plurality of image swaths obtained in a single scan extends over the width of the microscope array and the length of the scan over the object. If the objectives are appropriately staggered, each image swath is precisely aligned with the two swaths adjacent to it, so that concatenation can be carried out rapidly without further processing.

Figure 14:
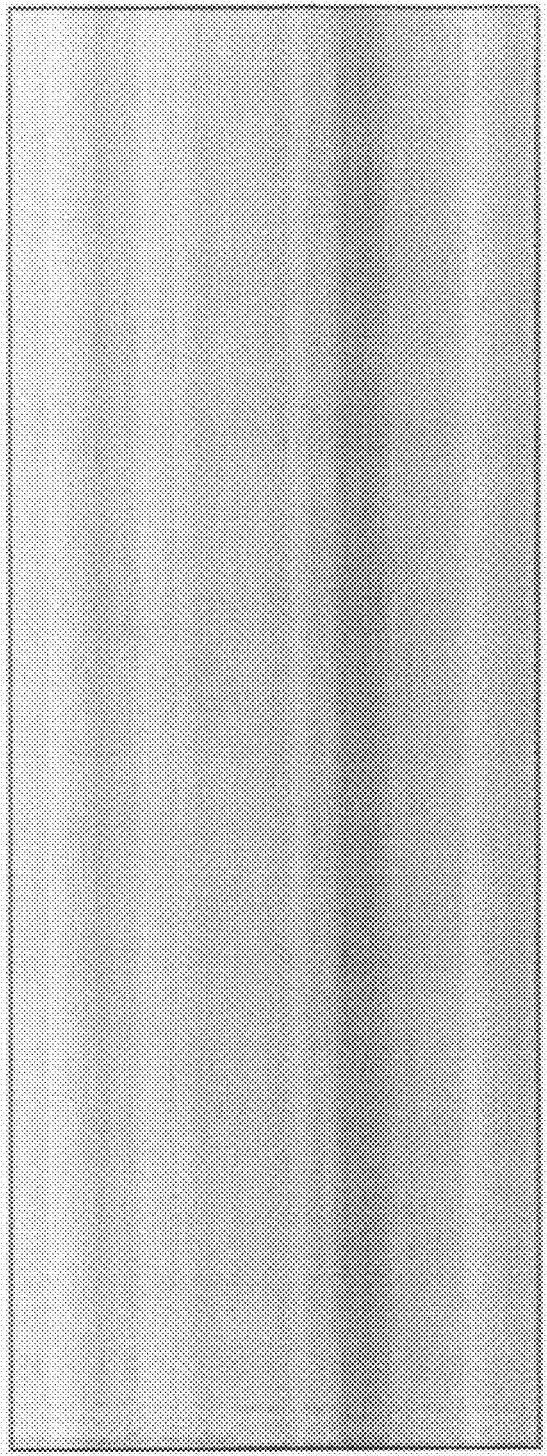
FIG. 14 shows a composite image produced by concatenating image swaths produced with linear scanning without correction.
Figure 15:
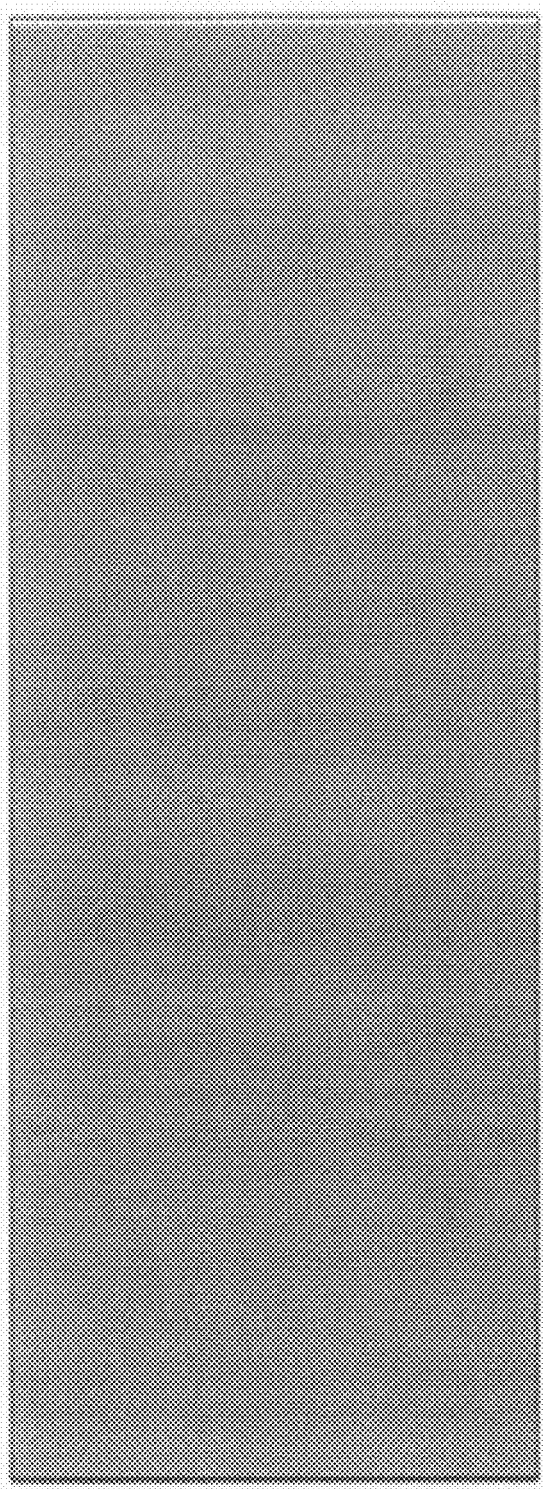
FIG. 15 shows the composite image produced by the same data after application of the correction matrix according to the invention.

FIGS. 14 and 15 illustrate the invention as applied to a linear scanning array wherein a correction matrix is used to account for gain and offset uniformity. FIG. 14 shows a composite image produced by concatenating image swaths without correction. FIG. 15 shows the composite image produced by the same data after application of the correction matrix according to the invention.

Thus, a method has been disclosed to produce a seamless color composite image of a large object area by acquiring data in with an array microscope. The method teaches the concept of normalizing all individual microscopes to produce images corrected for spatial misalignments and having uniform spectral-response, gain, offset, and aberration characteristics.

Therefore, while the invention has been shown and described herein in what is believed to be the most practical and preferred embodiments with reference to array microscopes operating in step-and-repeat scanning mode, it is recognized that it is similarly applicable to linear scanning. Accordingly, it is further understood that departures can be made within the scope of the invention, which is not to be limited to the details disclosed herein but is to be accorded the full scope of the claims so as to embrace any and all equivalent methods and products.

We claim:

1. A method of combining multiple swaths of images acquired with a linear scan of an object with an array microscope, comprising the following steps:
   providing a two-dimensional microscope array with a plurality of magnifying imaging systems disposed along a corresponding plurality of optical axes for imaging a picture of the object onto a detector, said plurality of magnifying imaging systems being arranged in rows and configured to image respective sections of the object, wherein said rows of imaging systems are staggered with respect to a linear direction of scan across the object, such that each of the imaging systems acquires image data corresponding to a respective continuous strip of the object along said linear direction of scan;
   providing a scanning mechanism for producing a relative movement between the microscope array and the object, said scanning mechanism operating continuously along said linear direction of scan across the object;
   calibrating said array microscope to derive correction factors for distortion in said image data;
   scanning the object to produce multiple adjacent image swaths of the object, each swath having a width defined by a field of view of a corresponding magnifying imaging system in the array and a length defined by said linear direction of scan across the object;
   applying said correction factors to said multiple image swaths to obtain multiple swaths of corrected images; and
   concatenating said multiple swaths of corrected images to produce a composite image of the object.

2. The method of claim 1, wherein said calibrating step further includes deriving correction factors for chromatic aberrations produced by the array microscope in said image data.

3. The method of claim 1, wherein said calibrating step further includes deriving correction factors for producing a uniform spectral response throughout the array microscope.

4. The method of claim 1, wherein said calibrating step further includes deriving correction factors for producing a uniform gain throughout the array microscope.

5. The method of claim 1, wherein said calibrating step further includes deriving correction factors for producing a uniform offset throughout the array microscope.

6. A method of combining multiple image swaths acquired in a linear scan of an object with an array microscope, comprising the following steps:
   providing a two-dimensional microscope array with a plurality of magnifying imaging systems disposed along a corresponding plurality of optical axes for imaging a picture of the object onto a detector, said plurality of magnifying imaging systems being arranged in rows and configured to image respective sections of the object, wherein said rows of imaging systems are staggered with respect to a linear direction of scan across the object, such that each of the imaging systems acquires image data corresponding to a respective continuous strip of the object along said linear direction of scan;
   providing a scanning mechanism for producing a relative movement between the microscope array and the object, said scanning mechanism operating continuously along said linear direction of scan across the object;
   calibrating said array microscope to derive correction factors to produce a uniform spectral response throughout said array microscope;
   scanning the object to produce multiple adjacent image swaths of the object, each swath having a width defined by a field of view of a corresponding magnifying imaging system in the array and a length defined by said linear direction of scan across the object;
   applying said correction factors to said multiple image swaths to obtain multiple swaths of corrected images; and
   concatenating said multiple swaths of corrected images to produce a composite image of the object.

7. The method of claim 6, wherein said calibrating step further includes deriving correction factors for chromatic aberrations produced by the array microscope in said image data.

8. The method of claim 6, wherein said calibrating step further includes deriving correction factors for producing a uniform gain throughout the array microscope.

9. The method of claim 6, wherein said calibrating step further includes deriving correction factors for producing a uniform offset throughout the array microscope.

10. A method of combining multiple image swaths acquired in a linear scan of an object with an array microscope, comprising the following steps:
    providing a two-dimensional microscope array with a plurality of magnifying imaging systems disposed along a corresponding plurality of optical axes for imaging a picture of the object onto a detector, said plurality of magnifying imaging systems being arranged in rows and configured to image respective sections of the object, wherein said rows of imaging systems are staggered with respect to a linear direction of scan across the object, such that each of the imaging systems acquires image data corresponding to a respective continuous strip of the object along said linear direction of scan;
    providing a scanning mechanism for producing a relative movement between the microscope array and the object, said scanning mechanism operating continuously along said linear direction of scan across the object;
    calibrating said array microscope to derive correction factors to produce a uniform gain throughout said array microscope;
    scanning the object to produce multiple adjacent image swaths of the object, each swath having a width defined by a field of view of a corresponding magnifying imaging system in the array and a length defined by said linear direction of scan across the object;
    applying said correction factors to said multiple image swaths to obtain multiple swaths of corrected images; and
    concatenating said multiple swaths of corrected images to produce a composite image of the object.

11. The method of claim 10, wherein said calibrating step further includes deriving correction factors for producing a uniform offset throughout the array microscope.

12. The method of claim 10, wherein said calibrating step further includes deriving correction factors for chromatic aberrations produced by the array microscope in said images.

13. The method of claim 10, wherein said calibrating step further includes deriving correction factors for producing a uniform spectral response throughout the array microscope.

14. A method of imaging an object with an array microscope comprising the following steps:

providing a two-dimensional microscope array with a plurality of magnifying imaging systems disposed along a corresponding plurality of optical axes for imaging a picture of the object onto a detector, said plurality of magnifying imaging systems being arranged in rows and configured to image respective sections of the object, wherein said rows of imaging systems are staggered with respect to a linear direction of scan across the object, such that each of the imaging systems acquires image data corresponding to a respective continuous strip of the object along said linear direction of scan;

providing a scanning mechanism for producing a relative movement between the microscope array and the object, said scanning mechanism operating continuously along said linear direction of scan across the object;

calibrating the array microscope to derive correction factors designed to correct imaging characteristics of said magnifying imaging systems in the array microscope in order to normalize an output thereof and produce images with uniform optical properties;

scanning the object to produce multiple adjacent image swaths of the object, each swath having a width defined by a field of view of a corresponding magnifying imaging system in the array and a length defined by said linear direction of scan across the object;

applying said correction factors to said multiple image swaths to obtain multiple swaths of corrected images; and concatenating said multiple swaths of corrected images to produce a composite image of the object.

15. The method of claim 14, wherein said imaging characteristics comprise at least one among spectral response, gain, offset, distortion, and chromatic aberration.

16. An array microscope for imaging an object comprising:

a two-dimensional microscope array with a plurality of magnifying imaging systems disposed along a corresponding plurality of optical axes for imaging a picture of the object onto a detector, said plurality of magnifying imaging systems being arranged in rows and configured to image respective sections of the object, wherein said rows of imaging systems are staggered with respect to a linear direction of scan across the object, such that each of the imaging systems acquires image data corresponding to a respective continuous strip of the object along said linear direction of scan;

a scanning mechanism for producing a relative movement between the microscope array and the object, said scanning mechanism operating continuously along said linear direction of scan across the object so as to produce multiple adjacent image swaths of the object, each swath having a width defined by a field of view of the array microscope and a length defined by said scan across the object;

means for calibrating the array microscope to derive correction factors designed to correct imaging characteristics of said magnifying imaging systems in the array microscope in order to normalize an output thereof and produce images with uniform optical properties;

means for applying said correction factors to the multiple image swaths to obtain multiple swaths of corrected images; and means for concatenating the multiple swaths of corrected images to produce a composite image of the object;

wherein said calibrating means consists of sample surfaces with predetermined physical characteristics designed to produce target images with predetermined optical properties, so that deviations from said predetermined optical properties may be used to compute correction factors relative to said imaging characteristics.

17. The array microscope of claim 16, wherein said imaging characteristics comprise at least one among spectral response, gain, offset, distortion, and chromatic aberration.

\* \* \* \* \*